United States Patent [19]

Yoshimi

[11] 3,921,156

[45] Nov. 18, 1975

[54] MAGNETIC BUBBLE MEMORY HAVING BY-PASS PATHS FOR DEFECTIVE LOOPS

[75] Inventor: Koichi Yoshimi, Tokyo, Japan

[73] Assignee: Nippon Electric Company, Ltd., Tokyo, Japan

[22] Filed: Sept. 7, 1973

[21] Appl. No.: 395,093

[30] Foreign Application Priority Data

Sept. 8, 1972 Japan ................................ 47-90739

[52] U.S. Cl... 340/174 T; 340/174 TF; 340/174 SR

[51] Int. Cl.[2] .................... G11C 11/14; G11C 19/08

[58] Field of Search... 340/174 TF, 174 ED, 174 SR

[56] References Cited

UNITED STATES PATENTS

| | | | |
|---|---|---|---|
| 3,613,058 | 10/1971 | Bonyhard et al. | 340/174 TF |
| 3,701,132 | 10/1972 | Bonyhard et al. | 340/174 TF |
| 3,713,116 | 1/1973 | Bonyhard et al. | 340/174 TF |
| 3,732,551 | 5/1973 | Homma et al. | 340/174 TF |
| 3,792,450 | 2/1974 | Bogar et al. | 340/174 ED |

OTHER PUBLICATIONS

IBM Tech. Disc. Bull, "Angelfish Logical Connectives for Bubble Domains," by Almase et al.; Vol. 13; No. 10; 3/71; pp. 2992, 2993.

IBM Tech. Disc. Bull., "Bubble Domain Decoder with Built-In Memory," by Keefe et al.; Vol. 14; No. 6; 11/71; pp. 1915, 1916.

*Primary Examiner*—Stanley M. Urynowicz, Jr.
*Attorney, Agent, or Firm*—Sughrue, Rothwell, Mion, Zinn & Macpeak

[57] ABSTRACT

A magnetic memory of the type storing information in the form of the presence or absence of magnetic domains at specified locations therein. The manufacturing yield of such memories is improved by providing alternate paths in a transfer loop to allow domains in the transfer loop to by-pass defective ones of a plurality of memory loops. The normal path in the transfer loop carries a domain past the entrance of all successive memory loops. Alternate paths are provided from the entrance of a memory loop subsequent to the successively positioned memory loop. If the successively positioned memory loop is defective, a semipermanently stored domain is entered into a postion which effectively places the alternate path into the transfer loop and effectively removes a normal path from the transfer loop.

11 Claims, 7 Drawing Figures

MAGNETIC BUBBLE MEMORY HAVING BY-PASS PATHS FOR DEFECTIVE LOOPS

BACKGROUND OF THE INVENTION

The present invention relates to a magnetic memory apparatus suited for use in an information handling system including an electronic computer and a repertory dialer memory. Briefly, the present invention relates to a major-minor loop type-memory apparatus capable of accurately storing a cylindrical magnetic domain (referred to as a bubble domain hereunder) surrounded by a single domain wall.

It is known that a bubble domain is produced in a sheet of single crystal material such as rare earth orthoferrite and uniaxial garnet and the like when a uniform static magnetic field of suitable field intensity is applied perpendicular to the sheet. It is also known that the domain is propagated along a magnetic field gradient when a nonuniform magnetic field is applied to the sheet. Such properties of the bubble domain made the realization of magnetic memory devices possible. Also, various logic circuits may be obtained by utilizing the phenomenon that a magnetic repelling force is exerted between two or more bubble domains. These facts are reported in SCIENTIFIC AMERICAN, June issue, 1971, pp. 78 to 90.

At present at least two systems are known as examples of a magnetic memory device using bubble domains. One of the systems, called "a major-minor loop system," has two type-loops (a minor loop and a major loop) to propagate the bubble domains therein. The minor loop is employed to store data, and the major loop is used to transfer the data from the minor loop (or, in other words, memory loop) to a detector. An advantage of the latter type system is the reduced number of domain generators for writing in the data and domain detectors for reading out the data which is required, as is described in IEEE TRANSACTION ON MAGNETICS, Vol. MAG-6, No. 3, September issue, 1970, pp. 447 to 448. In such a system, if any defect is present in the memory loop or in the magnetic medium (sheet) itself used in the magnetic device and in the magnetic pattern consisting of the memory loop for transferring the domains, the device must be removed, or the location of the defect in the memory loop must be stored in an extra memory means and be collated each time the data is read out or written in, or a complicated error correction circuit should be specially provided. Also, in the practical manufacturing of bubble domain elements, it is impossible to preclude the presence of defects therein. As a result, these devices are more costly to manufacture.

The other types of system is a decoder system in which the memory loops are disposed independent of each other, and each memory loop is provided with a bubble domain generator and a detector in one to one correspondence. Such a system is found in IEEE TRANSACTIONS ON MAGNETICS, June issue, 1972, Vol. MAG-8, No. 2, pp. 216 to 218.

According to this decoder system, if any defect exists in a memory loop, the arrangement of the decoder wiring can be suitably arranged beforehand such that access to the defective memory loop is eliminated. In this system, however, a large number of bubble domain generators and detectors are required and also, the memory density is low. Furthermore, when the decoder is installed on the magnetic medium, the memory density should be sacrificed. In addition, when the decoder is external, a large amount of wiring is required. As a result, the whole memory device is inevitably more costly to manufacture.

It is, therefore, one object of the invention to provide a magnetic memory apparatus free from the abovementioned disadvantages of the prior-art major-minor loop system.

SUMMARY OF THE INVENTION

Briefly, the magnetic memory apparatus of the present invention is characterized by a transfer loop having at least two routes along which a bubble domain can travel from one memory loop to the nearest memory loop and to the second nearest memory loop during the same time interval, and a means for selecting one of the two routes depending on whether or not any defect is found in the memory loop.

Thus, with the invention, a normal memory function may be maintained even if a defect exists in the minor loop.

DETAILED DESCRIPTION OF THE DRAWINGS

Figure 1:
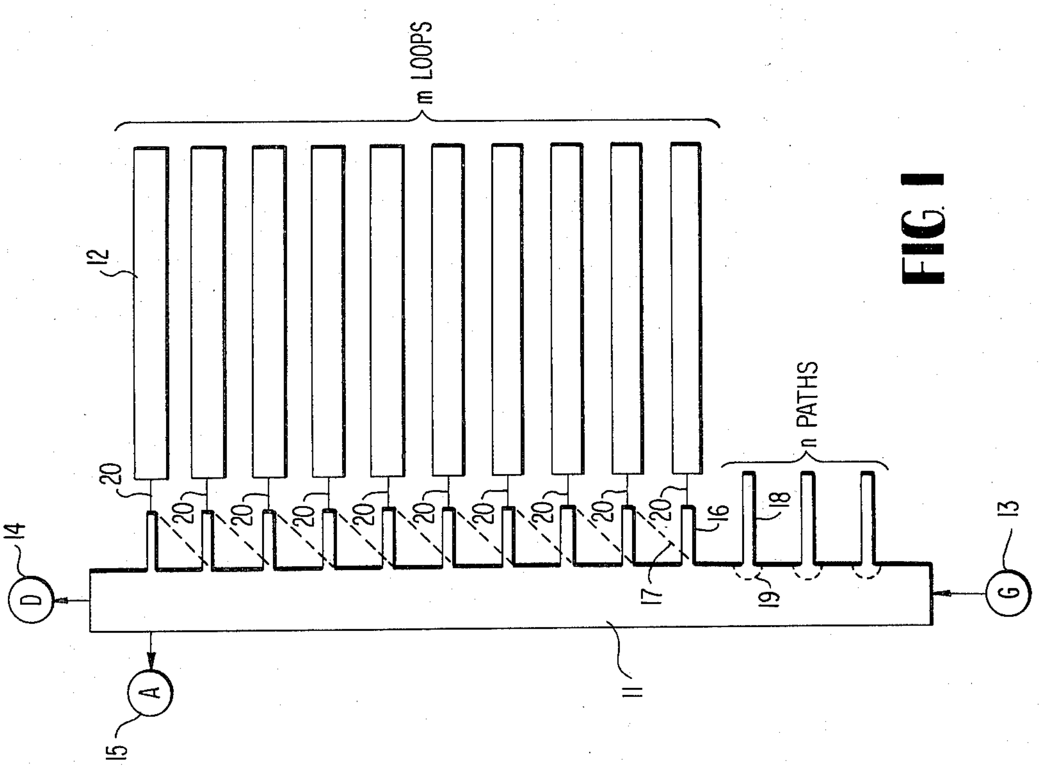
FIG. 1 shows a schematic diagram of the invention.

In FIG. 1, bubble domain propagating paths formed on a magnetic medium for holding bubble domains are indicated, and the magnetic medium itself, magnetic means for holding the domains and for transferring the domains, and external circuits necessary for the memory apparatus to operate are omitted for simplicity of illustration. In this respect, the magnetic means for holding the domains and for transferring them may be of the type described in "AIP Conference Proceedings," No. 5, published in 1972, page 226, FIG. 1.

A train of bubble domains representing input data and generated from a bubble domain generator 13 moves counterclockwise through a transfer loop 11. When the bubble domains reach a predetermined position corresponding to a memory loop 12, they enter the memory loop 12 through a gate 20. In this manner, the data is written in the loop 12. In order to read out the data, when the gate 20 is opened, the desired domain train is taken out of the memory loop 12, entered into the transfer loop 11, and propagated counterclockwise to be read out by a detector 14. In this operation, undesired domains are annihilated by an annihilator 15. Two different domain selection paths 16 and 17 are included in the transfer loop 11 for each gate 20. The domain passes through the path 17 when the corresponding memory loop 12 is defective. Assuming that memory loops 12 are employed, and that the allowable number of defective memory loops is $n$, $n$ correction paths 18 must be used. Whether the correction path 18 or a short-circuit path 19 through which the domain passes should be selected is determined according to the number of defective memory loops. In this manner, it is possible to make the time interval for the bubble domain to propagate once around the transfer loop 11 constant regardless of the selection of the path 16 or 17.

Figure 2:
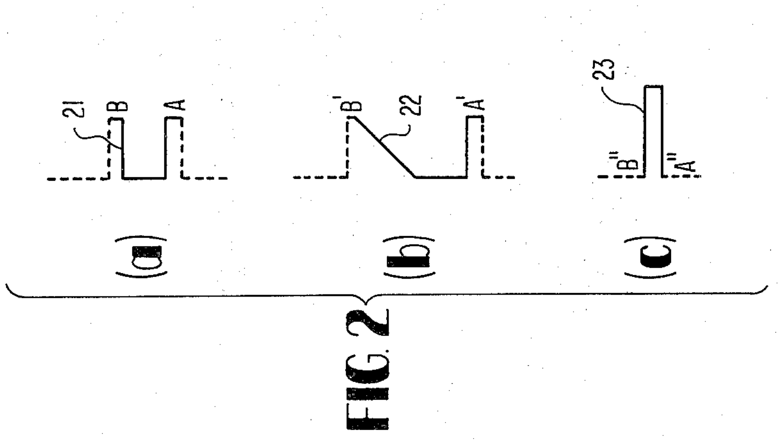
FIG. 2 shows a diagram for illustrating routes along which the bubble domain moves.

In FIG. 2 which shows the selection paths 16 and 17 and the correction paths 18, FIG. 2 (a) indicates a regular domain propagation path 21 in the portion between the adjacent memory loops A and B. It is assumed here that time interval p is needed for the domain to move from the memory loop A to B. Also, FIG. 2 (b) shows a domain propagation path 22 in the portion between the memory loops A′ and B′ less adjacent than loops A and B. It is assumed now that the memory loop located in the intermediate between the loops A′ and B′ is defective and that the loop cannot be used. It also takes time interval *p* for the bubble domain to travel through the path 22. FIG. 2 *c* indicates a correction path (corresponding to the correction path 18 of FIG. 1) to compensate for the length of the transfer loop 11. In this case, similarly, it takes time interval *p* for the domain to move from a position A″ to B″. As used herein, the phrases "path length" and " effective path length" mean the time it takes a domain to move through a path under given domain movement control conditions. Thus, while one path may actually be longer in linear dimensions than a second path, they are considered as having equal path lengths if it takes a domain the same time to travel said paths under the same movement control conditions.

Figure 3:
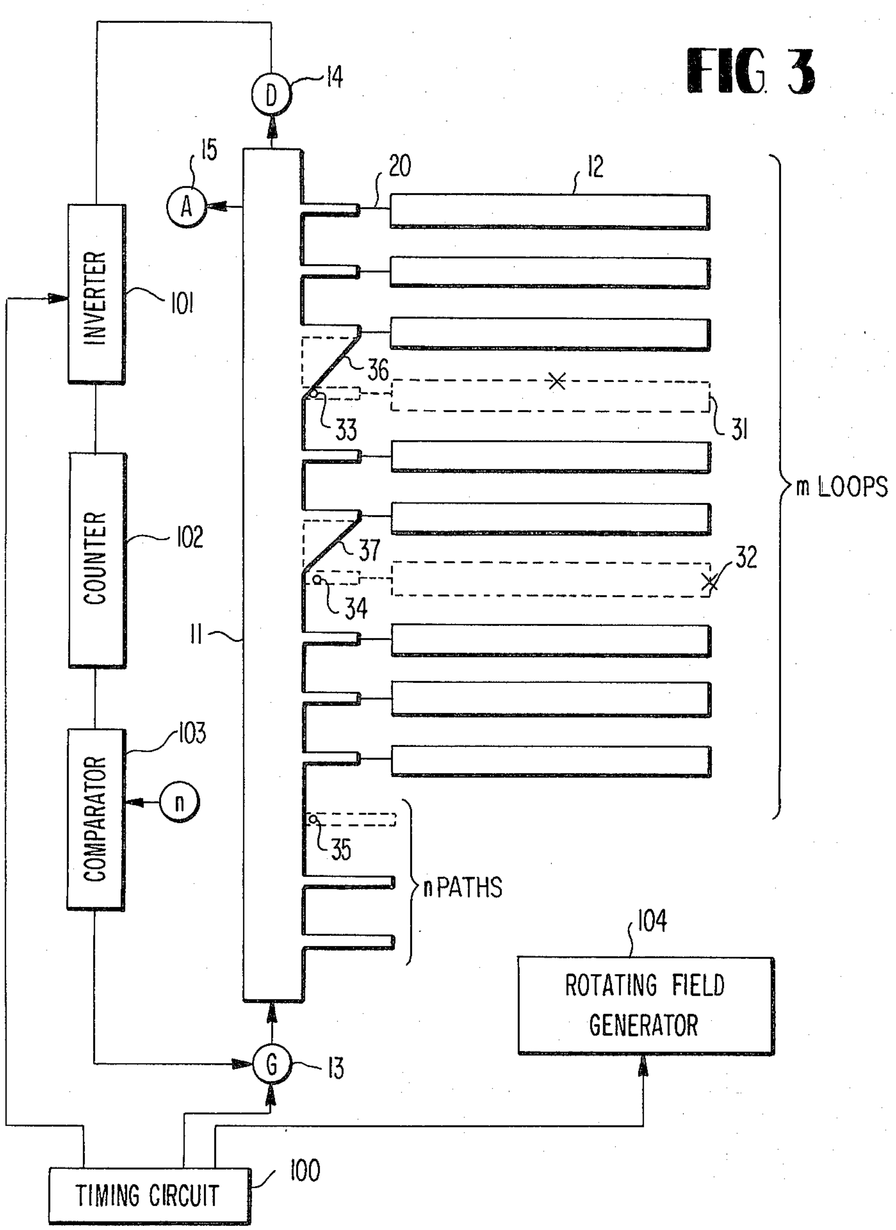
FIG. 3 shows a diagram for explaining premanipulation of the present memory apparatus.
Figure 4:
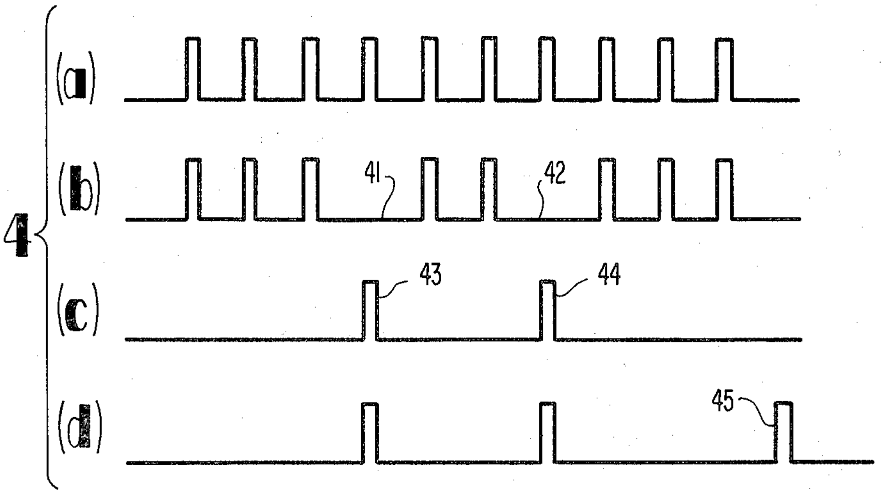
FIG. 4 (a) through 4 (d) show timing pulse trains required for the pre-manipulation of FIG. 3.

FIG. 3 and 4 illustrate how the selection path is set up in the transfer loop 11 in order to avoid the defective memory loops. In FIG. 4, the pulse train of waveform *a* represents the timewise arrangement of bubble domains for aligning the bubble domains for entry into the individual memory loops 12. The pulses of waveform *b* represent the detected outputs from loops 12. Waveform *c* represents the inverse of the outputs of waveform *b*. Waveform *d* represents the timing pulse train for rewriting the domains. It is assumed here that defects are found in the fourth and seventh memory loops, 31 and 32, and that any bubble domain entering such memory loops will vanish therein. In this case, the following premanipulation is carried out to properly operate the magnetic memory apparatus. The timing of the domain generator 13 is controlled as shown in waveform *a* by a timing circuit 100 so that one domain may be introduced in each of the memory loops 12. Each domain entering a loop 12 is propagated around the memory loop, and then taken out to the transfer loop 11. Thereafter, the domains are read out by the detector 14. The domains entering the defective memory loops 31 and 32 are annihilated and hence no outputs are detected at timings 41 and 42 in FIG. 4 *b*. The pulse train as shown in FIG. 4 *b* is supplied to an inverter circuit 101 to permit the pulses to be generated only at timings 43 and 44 as shown in FIg. 4 *c* corresponding to the memory loops 31 and 32 having the defects. Alternatively, these pulses at timings 43 and 44 may be generated from an external means by directly observing the defect with human eyes and with polarized light microscope. These pulse outputs are counted by a counter circuit 102, and supplied through a comparator circuit 103 to the generator 13. If the number of pulses counted by the circuit 102 is less than the allowable limit *n*, the circuit 103 further generates an additional number of pulses equal to the n minus the number of pulses generated from the counter circuit 102 in sequence at the timings corresponding to the next timing of the last memory loop. As a result, a total of n pulses generated from the comparator circuit 103 cause the domain generator 13 to generate n bubble domains. Thus, generated domains as mentioned above are propagated counterclockwise in the transfer loop 11 as in the previous manner and stopped at predetermined position *s* corresponding respectively to the defective memory loops and also the correction paths. Now, the domain propagation direction is reversed or, in other words, the domains are moved clockwise whereby the domains are trapped at portions 33, 34 and 35 and made immovable as will be described in greater detail hereafter. Thus, domain paths 36 and 37 are made in the transfer loop 11 so that the domains can avoid the defective memory loops 31 and 32. At the same time, a new transfer loop is formed without any change in the time interval required for the domain to once propagate around the transfer loop 11.

With such pre-manipulation, the magnetic memory apparatus may be used under the major-minor loop system with (m-n) memory loops unless a magnetic field large enough to eliminate the trapped domains is externally applied. If this pre-manipulation is performed in the process of production and testing of the apparatus at the factory, means for storing the location where a defect is present in a mamory loop or to detect the location of the defect are not needed. This leads the present magnetic memory apparatus to find broader applications. The detector 14 as shown in FIG. 3 may be composed of the one in FIG. 14 on page 221 in IEEE TRANSACTIONS ON MAGNETICS, Vol. MAG-8 No. 2, June issue, 1972. The annihilator 15 may be designed by one shown on page 90 in SCIENTIFIC AMERICAN, June issue, 1971. The counter circuit 102 may be the type described in DESIGN OF TRANSISTORIZED CIRCUITS FOR DIGITAL COMPUTERS published by JOHN F. RIDER PUBLISHER INC., 1959, in particular on pages 1–7 to 1–9 (see description of FIGS. 1–9 and 1–10), and the comparator circuit 103 may be the type one described on pages 2–32 2–33 (particularly, see FIGS. 2–31).

Figure 5:
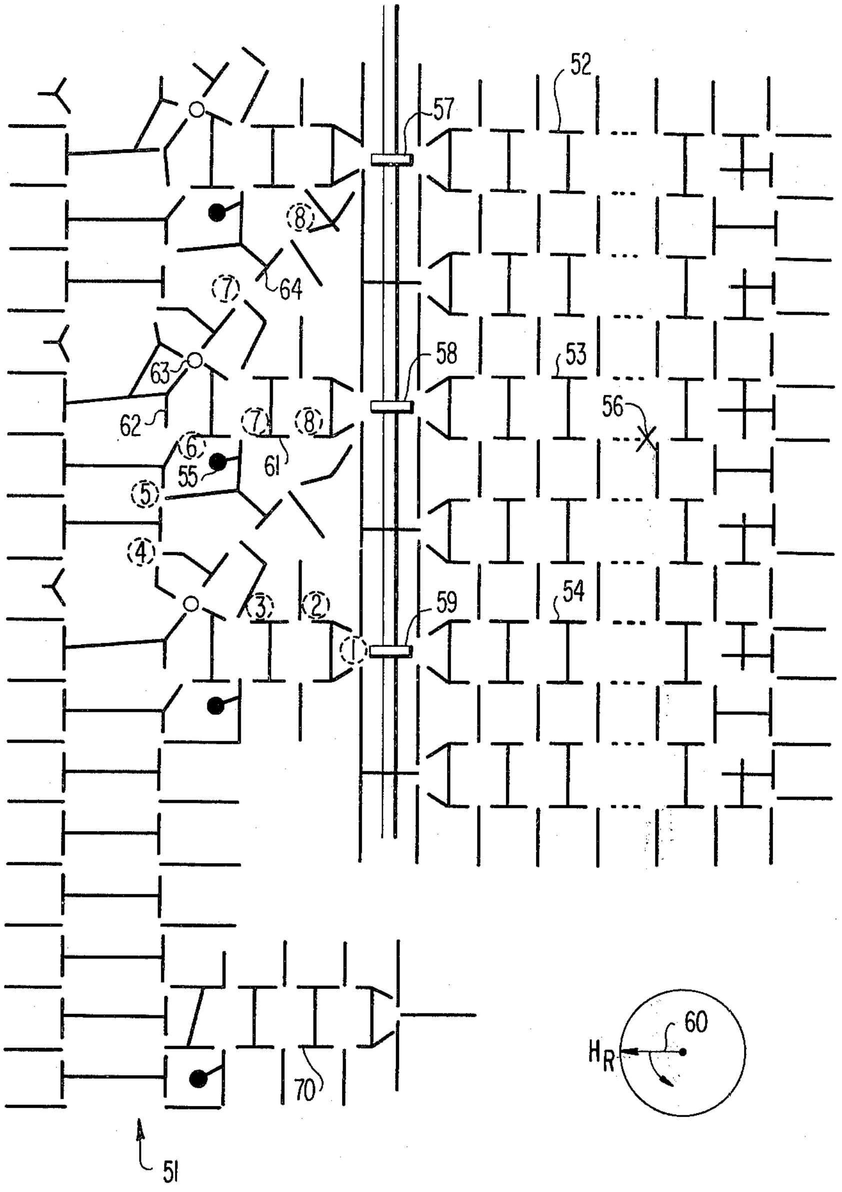
FIG. 5 shows a diagram of one embodiment of the invention using permalloy patterns.

Such self-recovery type memory apparatus can be exemplified by the use of permalloy patterns of T-bar type as shown in FIG. 5.

Since the method in which the domain is propagated by a rotating magnetic field $H_R$ applied from a rotating field generator 104 of FIG. 3 to the T-bar type self magnetic patterns has been known in the art as described in IEEE TRANSACTIONS ON MAGNETICS, September issue, 1969, Vol. MAG-5, No. 3, pp. 554 to 557, detailed description is not given here.

Figure 6:
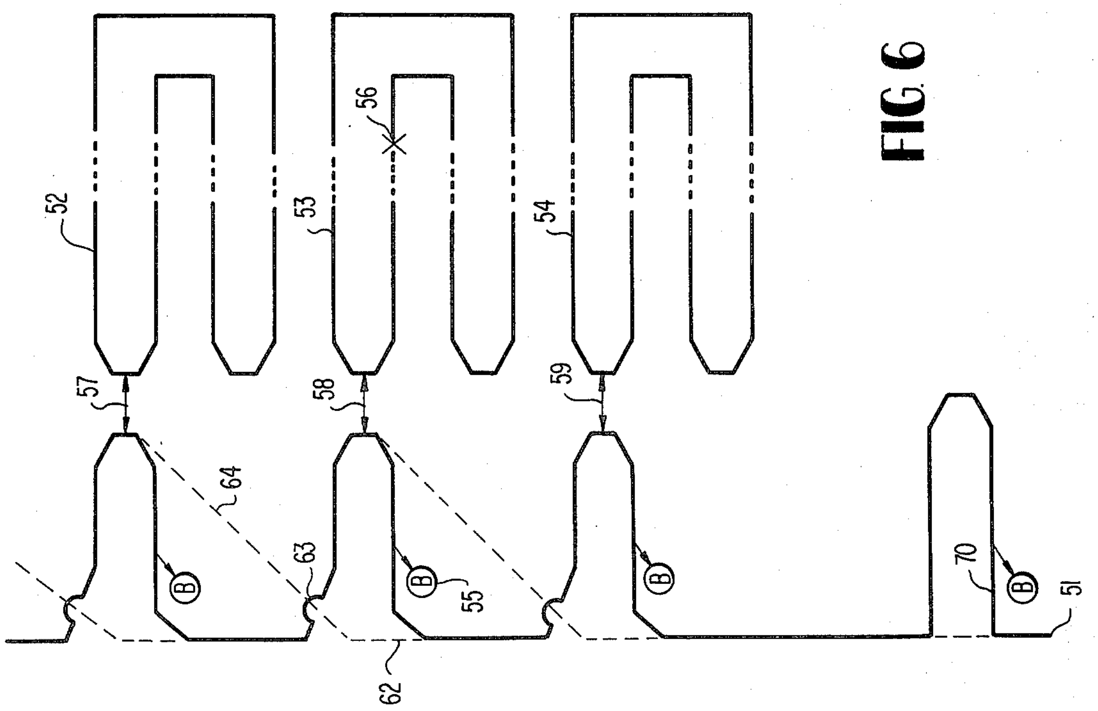
FIG. 6 shows a diagram for illustrating the paths of the domains of FIG. 5.

The domain propagation path of FIG. 5 is specifically shown in FIG. 6, and the further features of the apparatus of the invention will be explained below with reference to FIGS. 5 and 6.

The present magnetic memory apparatus of major-minor system shown in FIG. 1 comprises a part 51 of the transfer loop 11, three memory loops 52, 53 and 54 similar to the memory loop 12 shown in FIG. 1, and a correction loop 70. A part 55 for trapping the domain is constituted by a disc of soft magnetic film, and a domain once attached to the disc cannot easily be separated therefrom because of large interaction between the domain and the disc.

Figure 7:
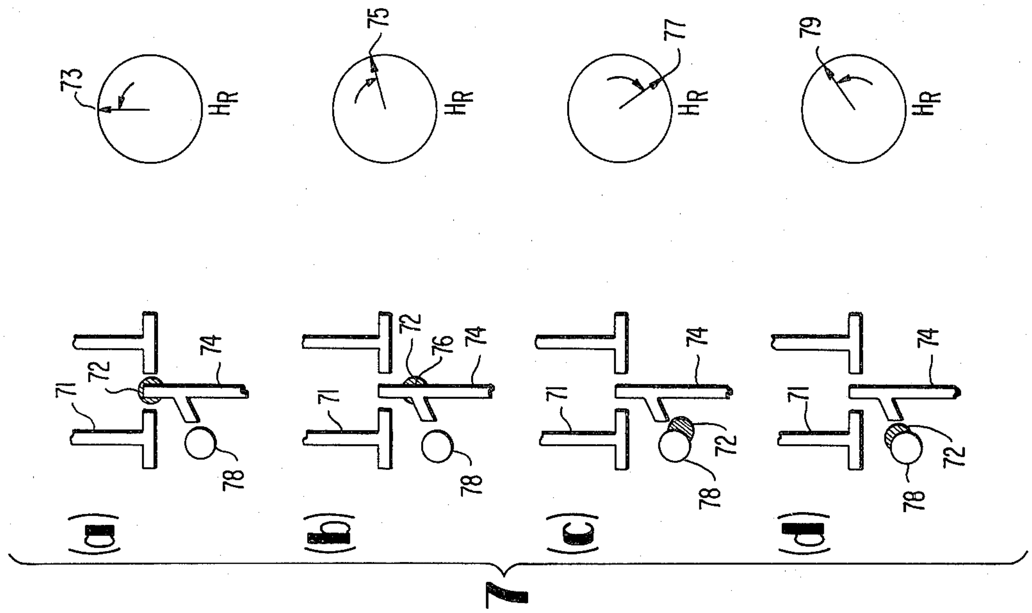
FIG. 7 shows a diagram of the trapping part 55 in FIG. 5.

In FIGS. 7 *a* through 7 *d* which show the enlarged magnetic patterns appearing near the trapping part 55 of FIG. 5, a bubble domain 72 propagated through a T-pattern 71 by the counterclockwise rotating magnetic field $H_R$ goes ahead of a deformed I-pattern 74 when the rotating magnetic field $H_R$ stands at phase 73 (FIG. 7 *a*). Next, when the field $H_R$ comes to phase 75 as a result of its clockwise rotation, the domain moves to a position 76 (FIG. 7 *b*). In addition, upon application of the clockwise rotating magnetic field $H_R$ thereto, the domain is propagated to a disc 78 of soft magnetic material at phase 77 (FIG. 7*c*). Once the domain is settled in the disc 78, this domain can hardly be separated from the disc 78 even if the rotating magnetic field $H_R$ is applied counterclockwise at phase 79 (FIG. 7 *d*). In this way, the domain trapping part 55 is established.

Assuming here that a defect is present in a position 56 in the memory loop 53, the foregoing premanipulation is made whereby three (namely, the number of memory loops) domains are generated by the domain generator 13 (FIG. 1). These domains are introduced into the memory loops 52, 53 and 54 through gates 57, 58 and 59, respectively. Then, the domains are taken out to the transfer loop 51 through the gates 57, 58 and 59. Since the domain given to the memory loop 53 vanishes at the defect 56, two domains are present in the loop 51. After this process, a domain is generated only at the timing corresponding to the memory loop 53 with the defect, and is moved in the transfer loop 51 to a position a little beyond the vicinity of the trapping part 55. Then, the rotating magnetic field $H_R$ is reversed into the clockwise direction so that the domain enters the trapping part 55. Once the domain is trapped therein, it cannot be released regardless of the direction of the supply of the field $H_R$. As described previously referring to FIG. 1, the domain is trapped to the *n-l* correction loops so that the domain for data is transferred through only one (as indicated by 18 in FIG. 1) of n correction loops 70. In the above-mentioned manner, the timing is preadjusted according to the number of defective memory loops. After premanipulation, the domains corresponding to given data are written in the individual memory loops.

Assuming that one domain corresponding to data is introduced into each of memory loops 53 and 54, and that the two domains are distant from each other by 8 steps, or 8 cycles of the rotating magnetic field $H_R$, the time interval between the gates 58 and 59 is equivalent to 8 steps counted by the stable position of the domain at the phase of the field $H_R$ as indicated by the reference numeral 60 in FIG. 5. This is evident from the numerals encircled by broken lines in FIG. 5. Primarily, the two domains should come to the positions of the gates 58 and 59 after they have been propagated over a certain distance. As a practical matter, however, the defect 56 is found in the memory loop 53, and a domain is given in the trapping part 55 beforehand. As a result, the preceding domain cannot enter a part 61 of the transfer loop 51, and consequently this domain advances to a part 62 due to the repelling interaction with the domain present in trapping part 55. Thus, the repelled domain goes to a path 64 through an intersection 63 and reaches the gate 57. Such intersection 63 of the domain is described in U.S. Pat. No. 3,543,255 (FIGS. 2 to 30), and therefore, detailed description will not be given here. The number of steps between the gates 57 and 59 in the event that a domain is present in the trapping part 55 is eight as indicated by the encircles of the broken-line of FIG. 5 at phase position 60 of the rotating magnetic field. Therefore, the two domains generated from the domain generator 13 (FIG. 1) depending on the given data can avoid the defective memory loop 53 and are stored in the memory loops 52 and 54 without deviation from the correct timing. According to the invention, it is apparent that more than two domains may readily be stored as avoiding the defective memory loop without any error.

In the above-mentioned embodiement of the invention, various shapes of permalloy pattern may be used, and also, the invention is applicable to the major-minor loop type memory system without using any permalloy patterns.

The invention is not efficient in the case where two successive memory loops are defective. However, in the practical domain memory apparatus, the probability of the defect found in two successive memory loops is comparatively small since the defect occurs over the entire surface of the apparatus at a nearly equal probability. This indicates therefore that the present apparatus is more useful and efficient.

Briefly, the use of the present apparatus enables great saving of magnetic material to enhance the yield rate, obviates the need for conventional complicated peripheral devices, and permits the apparatus to be manufactured at low cost.

It would be apparent, however, that a number of alternatives and modifications can be made within the scope of the present invention defined by the appended claims.

What is claimed:

1. A magnetic memory apparatus comprising: a magnetic medium capable of holding bubble domains; magnetic means for permitting the domains to stably stay in the magnetic medium; magnetic means for propagating the domains; a plurality of memory loops; a transfer loop comprising; a first and a plurality of second domain propagation paths capable of circulating domains therein, each of said second paths beginning and ending in said first path and constituting a bypass of the part of said first path between said beginning and ending; means for selectively transferring the domains between the first domain propagating path and the plurality of memory loops to write and read data into or from the memory loops; means for detecting a defect in any memory loops which prevents the domains from propagating; means for operating any of said second domain propagating paths in order to cause the domains to pass therethrough and to avoid the part of said first domain propagating path which leads to the detected defective memory loop.

2. A magnetic memory apparatus of claim 1 in which there is provided a means for arbitrarily selecting one of said second domain propagation paths so that during the time interval for the domains to be transferred from a position in the transfer loop which leads to the memory loop located immediately before the defective memory loop to a position in the transfer loop which leads to the defective memory loop, the domains can reach the memory loop located immediately after the defective memory loop from the memory loop located immediately before the defective memory loop.

3. A magnetic memory apparatus of claim 2 in which the transfer loop has auxiliary paths connected thereto for keeping the effective length of the transfer loop constant and means for selectively operating said auxiliary paths depending on the number of defective memory loops to keep the effective length of the transfer loop constant.

4. A bubble domain memory of the type which is capable of storing bubble domains therein, said memory comprising, a. a plurality of memory loops for storing domains therein, each said memory loop having an entrance and being adapted to selectively receive domains which are at a position outside said memory loop but adjacent to said entrance and to selectively provide domains from said loop to said position outside said entrance, b. a transfer loop for circulating domains therein, said transfer loop comprising, i) a plurality of domain holding positions equal to, outside of, and adjacent to said respective entrances of said plurality of memory loops, ii. a plurality of normal domain paths, each one provided between a different pair of said domain holding positions, whereby the totality of said normal paths used provide a series path for carrying a domain successively to the domain holding positions adjacent to the entrances of each said memory loop, iii. a plurality of alternate paths, each positioned to bypass the domain holding position adjacent the entrance of a respective one of said memory loops, and iv. bypass control means, one associated with each said alternate path, for selectively causing a domain circulating in said transfer loop to travel along the corresponding alternate path thereby bypassing part of the normal path which normally carries the domain to the domain holding position adjacent the entrance of an associated memory loop.

5. A bubble domain memory as claimed in claim 4 wherein said transfer loop further has a number of auxiliary paths connected thereto for keeping the effective length of the transfer loop constant and auxiliary path blocking means associated with each of said auxiliary paths for selectively causing a circulating domain to bypass said auxiliary paths.

6. A bubble domain memory as clained in claim 4 wherein the effective path lengths of said alternate and normal paths are such that the effective path length between first and second domain holding positions via a said normal path is equal to the effective path length between said first and a third domain holding position via a said alternate path, where said first, second and third domain holding positions are positioned successively in said transfer loop in the direction of normal domain circulation.

7. A bubble domain memory as claimed in claim 6 wherein the effective path lengths of said normal path and said auxiliary path are substantially identical.

8. A bubble domain memory as claimed in claim 7 further comprising automatic means for activating the said bypass control means associated with each said memory loop that is defective and for activating all said auxiliary path blocking means except for a number equal to the number of activated bypass control means, whereby the decrease in path length of the transfer loop caused by the effective removal of certain normal paths is compensated by the effective addition of the non-blocked auxiliary paths.

9. A bubble domain memory as claimed in claim 4 wherein said normal and said alternate paths comprise thin film patterns of soft magnetic film positioned to direct the movement of a domain under the influence of a rotating magnetic field in the plane of said thin film patterns, and wherein said bypass control means comprises, for each said alternate path respectively, a thin film of soft magnetic material shaped in a pattern to hold a domain irrespective of the direction of said rotating magnetic field and position adjacent said alternate path and a said normal path, whereby a domain traveling in said normal path near said bypass control means will be diverted to said alternate path by the repelling force of a domain held at said bypass control means.

10. A bubble domain memory as claimed in claim 5 wherein said normal and said alternate paths comprise thin film patterns of soft magnetic film positioned to direct the movement of a domain under the influence of a rotating magnetic field in the plane of said thin film patterns, and wherein said bypass control means comprises, for each said alternate path respectively, a thin film soft magnetic material shaped in a pattern to hold a domain irrespective of the direction of said rotating magnetic field and positioned adjacent said alternate path and a said normal path, whereby a domain traveling in said normal path near said bypass control means will be diverted to said alternate path by the repelling force of a domain held at said bypass control means.

11. A bubble domain memory as claimed in claim 10 wherein said auxiliary path blocking means are substantially identical to said bypass control means.

* * * * *